(No Model.)
C. F. ROPER.
THUMB TACK.
No. 306,431.          Patented Oct. 14, 1884.
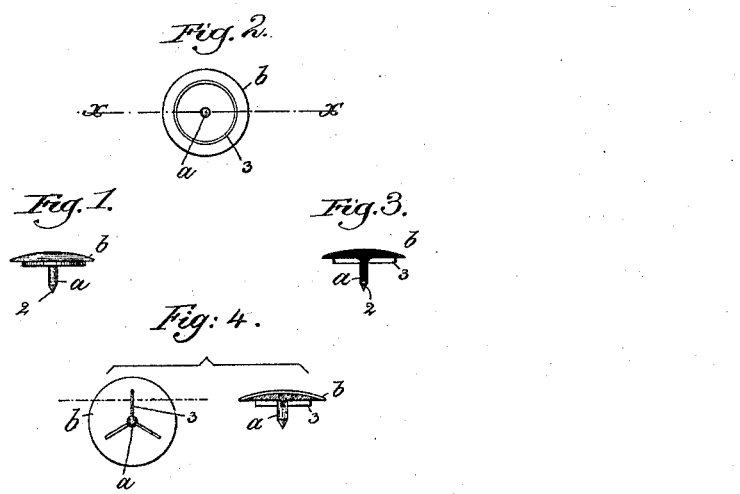
Witnesses.
John F. C. Prinkirk
Henry Marsh.
Inventor:
Charles F. Roper
by Crosby & Gregory, attys

UNITED STATES PATENT OFFICE.

CHARLES F. ROPER, OF HOPEDALE, MASSACHUSETTS.

THUMB-TACK.

SPECIFICATION forming part of Letters Patent No. 306,431, dated October 14, 1884.

Application filed May 26, 1884. (No model.)

*To all whom it may concern:*

Be it known that I, CHARLES F. ROPER, of Hopedale, county of Worcester, State of Massachusetts, have invented an Improvement in Thumb-Tacks, of which the following description, in connection with the accompanying drawings, is a specification, like letters on the drawings representing like parts.

Thumb-tacks as heretofore constructed have usually been composed of a shank and an independent head composed of either brass or white-metal, and the under sides of the heads have always been smooth or in the same plane, so that when closely down upon the paper a knife-blade or some other instrument having a fine point has been required to lift them.

My improved thumb-tack is composed of a shank and disk-like head, having at its under side a paper-engaging tooth or projection, which, as herein shown, is made to resemble an annular V-shaped projection located between the shank and the periphery of the head, and preferably the said head and shank will be integral.

Figure 1 is a side elevation of a thumb-tack embodying my invention; Fig. 2, an under side view; Fig. 3, a cross-section on the line *x x*, Fig. 2; and Fig. 4, a modification to be described.

In the drawings, *a* represents the shank of the thumb-tack, pointed at 2. The head *b* of the thumb-tack is shown integral with the said shank, and at its under side the said head is provided with an annular V-shaped paper-engaging tooth, 3, which, as the shank of the thumb-tack is pressed into a drafting or other board, embeds itself into the paper under it and holds the latter, even should the shank not have penetrated the paper.

My improved thumb-tack is formed, preferably, from a steel rod of suitable diameter for the size of head desired, the shank being produced by a suitable tool which cuts away the said rod at suitable intervals, and finally the completed tacks are cut off from the rod, one at a time.

My improved thumb-tacks may be tempered to the desired hardness, are more cheaply made than heretofore, and owing to the paper-engaging projection at the under side of the head the latter is kept a little above the paper, thus leaving a space between the head and paper for the introduction of the thumb-nail to lift the tack.

The modified form of tack shown in Fig. 4 has its head separate from its shank; but the under side of the head is provided with several paper-engaging teeth or projections, (marked 3,) which act as does the correspondingly-marked projection in Figs. 1 to 3.

I do not claim a T-shaped sheet-metal tack having a long head, the width of which corresponds with the thickness of the sheet metal from which the tack is cut or stamped, substantially as shown in United States Patent to J. A. Smith, Jr., No. 296,475, dated April 8, 1884.

I claim—

1. A thumb-tack composed of the disk-like head and centrally-located pointed shank, the said head being provided at its under side with the paper-engaging rib or projection, to operate substantially as described.

2. A thumb-tack composed, essentially, of the disk-like head and centrally-located cylindrical pointed prong or shank integral therewith, the said head being provided at its under side with an annular rib or projection, substantially as described.

In testimony whereof I have signed my name to this specification in the presence of two subscribing witnesses.

CHARLES F. ROPER.

Witnesses:
G. W. GREGORY,
GEO. A. DRAPER.